United States Patent
McDonnell et al.

(10) Patent No.: US 11,100,499 B1
(45) Date of Patent: Aug. 24, 2021

(54) LOCATION MODELING USING TRANSACTION DATA FOR VALIDATION

(71) Applicant: Google Inc., Mountain View, CA (US)

(72) Inventors: Philip McDonnell, San Francisco, CA (US); Joshua Sacks, Mountain View, CA (US); Michael Chu, Los Altos, CA (US); Zhengrong Ji, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 1287 days.

(21) Appl. No.: 14/683,830

(22) Filed: Apr. 10, 2015

Related U.S. Application Data

(60) Provisional application No. 61/990,077, filed on May 7, 2014.

(51) Int. Cl.
*G06Q 20/40* (2012.01)
*G16Y 20/10* (2020.01)
*G06Q 20/32* (2012.01)

(52) U.S. Cl.
CPC ....... *G06Q 20/401* (2013.01); *G06Q 20/3224* (2013.01); *G16Y 20/10* (2020.01)

(58) Field of Classification Search
None
See application file for complete search history.

(56) References Cited

U.S. PATENT DOCUMENTS

| | | | | |
|---|---|---|---|---|
| 8,295,898 B2 * | 10/2012 | Ashfield | ............ | G06Q 20/3224 455/456.1 |
| 8,306,554 B1 * | 11/2012 | Jenkins | ............ | H04L 51/38 455/456.3 |
| 8,319,685 B2 * | 11/2012 | Raento | ............ | H04W 4/029 342/357.74 |
| 8,332,272 B2 * | 12/2012 | Fisher | ............ | H04W 4/21 705/16 |
| 8,412,626 B2 * | 4/2013 | Hirson | ............ | G06Q 20/32 705/35 |
| 8,644,506 B2 * | 2/2014 | Zellner | ............ | H04L 41/12 380/249 |

(Continued)

FOREIGN PATENT DOCUMENTS

| | | | | |
|---|---|---|---|---|
| WO | WO-2008115715 A1 * | 9/2008 | ............ | H04L 67/18 |
| WO | WO-2014121024 A1 * | 8/2014 | ......... | G06Q 30/0601 |

OTHER PUBLICATIONS

Xinfeng Li; Jin Teng; Boying Zhang; Adam C. Champion. A Service for Controlling Information Dissemination in Wireless Networks. IEEE Transactions on Mobile Computing (vol. 13, Issue: 2, pp. 250-262). 2013 (Year: 2013).*

*Primary Examiner* — El Mehdi Oussir
(74) *Attorney, Agent, or Firm* — Foley & Lardner LLP

(57) ABSTRACT

Location modeling may be generated for candidate locations based on validated location data. The location models for candidate locations may be based on validated location data associated with wireless access points that is validated using transaction data. Such validation may include comparing an identifier associated with candidate location data received from a client device to an identifier for a transaction account associated with a transaction from transaction data at a candidate location. Matching transaction data and candidate location data may generate validated location data to be used in generating location models for candidate locations.

17 Claims, 10 Drawing Sheets

(56) References Cited

U.S. PATENT DOCUMENTS

| | | | | |
|---|---|---|---|---|
| 8,660,358 B1* | 2/2014 | Bergboer | G06K 9/00677 | 345/629 |
| 8,869,241 B2* | 10/2014 | Davis | G06F 21/316 | 713/175 |
| 8,954,276 B1* | 2/2015 | Dupont | G01C 21/206 | 701/533 |
| 2002/0157029 A1* | 10/2002 | French | G06F 21/31 | 726/21 |
| 2003/0065805 A1* | 4/2003 | Barnes, Jr. | G06Q 10/02 | 709/231 |
| 2004/0014457 A1* | 1/2004 | Stevens | G06Q 20/04 | 455/414.1 |
| 2009/0187492 A1* | 7/2009 | Hammad | G06Q 10/087 | 705/26.1 |
| 2009/0288012 A1* | 11/2009 | Hertel | G06Q 20/02 | 715/738 |
| 2011/0167440 A1* | 7/2011 | Greenfield | H04L 63/102 | 725/25 |
| 2012/0047003 A1* | 2/2012 | Hammad | G06Q 30/0207 | 705/14.1 |
| 2012/0095916 A1* | 4/2012 | Dorsey | G06Q 20/3224 | 705/44 |
| 2012/0137340 A1* | 5/2012 | Jakobsson | G06F 21/316 | 726/1 |
| 2012/0239576 A1* | 9/2012 | Rose | G06Q 20/02 | 705/44 |
| 2013/0102283 A1* | 4/2013 | Lau | H04W 12/06 | 455/411 |
| 2013/0173467 A1* | 7/2013 | Nuzzi | G06Q 20/3224 | 705/44 |
| 2013/0219454 A1* | 8/2013 | Hewinson | G06F 21/31 | 726/1 |
| 2013/0267255 A1* | 10/2013 | Liu | H04W 4/029 | 455/456.3 |
| 2014/0058815 A1* | 2/2014 | Hiremath | G06Q 30/0215 | 705/14.17 |
| 2014/0289821 A1* | 9/2014 | Wilson | G06Q 20/42 | 726/5 |
| 2014/0330721 A1* | 11/2014 | Wang | G06Q 20/40 | 705/44 |
| 2014/0365304 A1* | 12/2014 | Showers | G01S 5/0252 | 705/14.55 |
| 2015/0106265 A1* | 4/2015 | Stubblefield | G06Q 50/265 | 705/44 |
| 2015/0120549 A1* | 4/2015 | Khalid | G06Q 20/4014 | 705/44 |
| 2015/0213474 A1* | 7/2015 | Howe | G06Q 30/0222 | 705/13 |
| 2015/0227926 A1* | 8/2015 | Grigg | G06Q 20/32 | 705/64 |
| 2016/0217381 A1* | 7/2016 | Bloomquist | G06N 5/046 | |
| 2018/0295564 A1* | 10/2018 | Madan | H04L 63/083 | |

\* cited by examiner

310 →

| Time | Location Data |
|---|---|
| 10:30:07 | 34-56-78-19-2A-3B; 88 dBm |
| 10:32:05 | 34-56-78-19-2A-3B; 90 dBm |
| 10:34:12 | 34-56-78-19-2A-3B; 85 dBm |
| 10:36:18 | 34-56-78-19-2A-3B; 83 dBm |
| 10:38:22 | 34-56-78-19-2A-3B; 86 dBm |

| Time | Location Data |
|---|---|
| 10:30:07 | 4A-5B-12-34-56-78; 88 dBm<br>3A-4B-12-34-56-78; 18 dBm<br>12-34-56-78-1A-2B; 22 dBm |
| 10:32:05 | 4A-5B-12-34-56-78; 86 dBm<br>3A-4B-12-34-56-78; 20 dBm<br>12-34-56-78-1A-2B; 24 dBm |
| 10:34:12 | 4A-5B-12-34-56-78; 89 dBm<br>3A-4B-12-34-56-78; 20 dBm<br>12-34-56-78-1A-2B; 20 dBm |
| 10:36:18 | 4A-5B-12-34-56-78; 90 dBm<br>3A-4B-12-34-56-78; 18 dBm<br>12-34-56-78-1A-2B; 15 dBm |
| 10:38:22 | 4A-5B-12-34-56-78; 95 dBm<br>3A-4B-12-34-56-78; 22 dBm |

| Time | Location Data |
|---|---|
| 10:30:07 | 4A-5B-12-34-56-78; 78 dBm<br>3A-4B-12-34-56-78; 12 dBm<br>12-34-56-78-1A-2B; 26 dBm |
| 10:32:05 | 4A-5B-12-34-56-78; 76 dBm<br>3A-4B-12-34-56-78; 14 dBm<br>12-34-56-78-1A-2B; 28 dBm |
| 10:34:12 | 4A-5B-12-34-56-78; 74 dBm<br>3A-4B-12-34-56-78; 12 dBm<br>12-34-56-78-1A-2B; 34 dBm |
| 10:36:18 | 4A-5B-12-34-56-78; 72 dBm<br>3A-4B-12-34-56-78; 10 dBm<br>12-34-56-78-1A-2B; 38 dBm |
| 10:38:22 | 4A-5B-12-34-56-78; 50 dBm<br>12-34-56-78-1A-2B; 60 dBm |

| Time | Location Data |
|---|---|
| 10:30:07 | 3B-2A-12-34-56-78; 45 dBm |
| 10:32:05 | 12-34-56-78-1A-2B; 32 dBm<br>3B-2A-12-34-56-78; 30 dBm |
| 10:34:12 | 12-34-56-78-1A-2B; 74 dBm<br>4A-5B-12-34-56-78; 10 dBm<br>3A-4B-12-34-56-78; 5 dBm |
| 10:36:18 | 4A-5B-12-34-56-78; 30 dBm<br>3A-4B-12-34-56-78; 60 dBm<br>12-34-56-78-1A-2B; 40 dBm |
| 10:38:22 | 4A-5B-12-34-56-78; 45 dBm<br>3A-4B-12-34-56-78; 60 dBm |

FIG. 3D

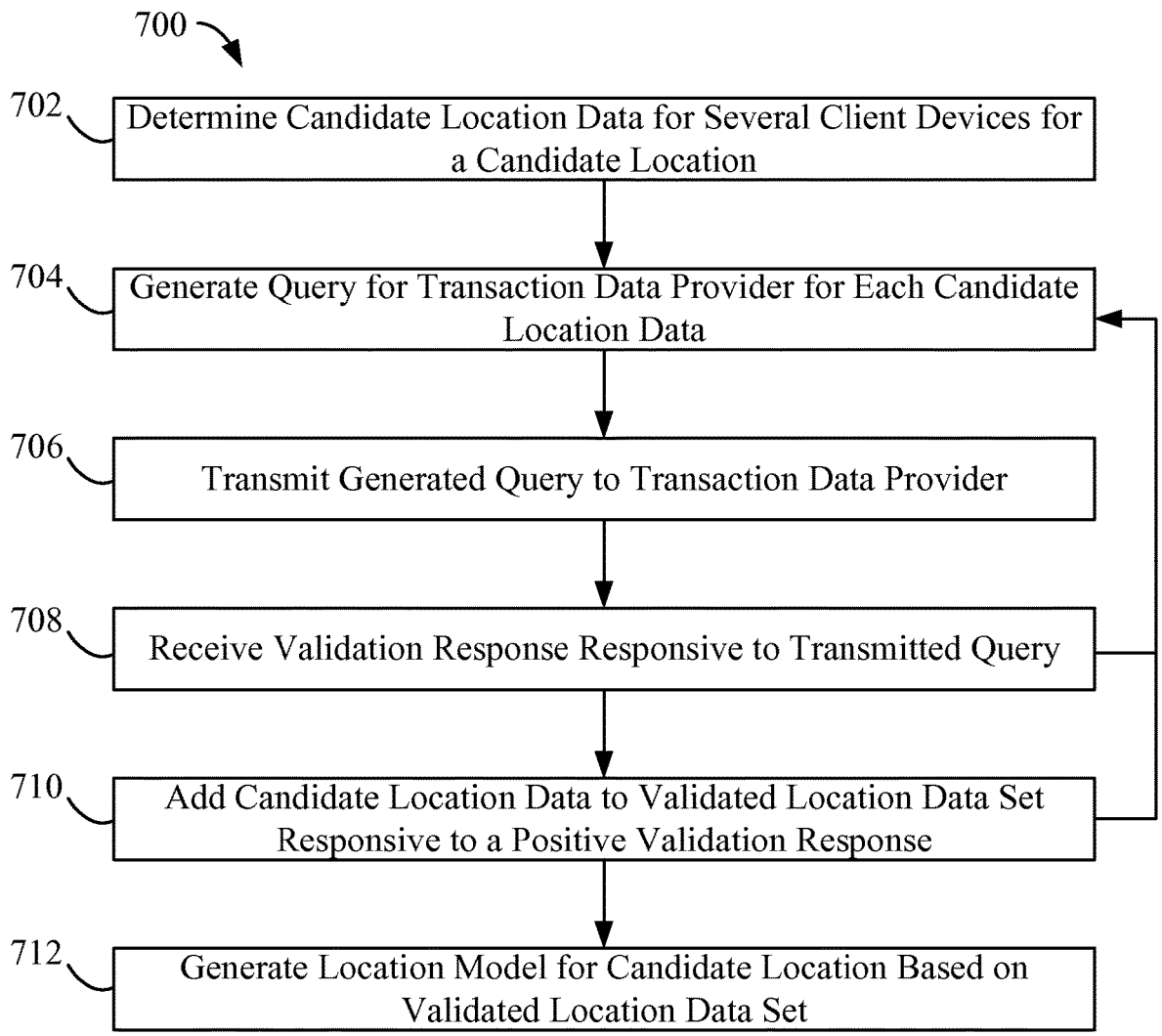

LOCATION MODELING USING TRANSACTION DATA FOR VALIDATION

BACKGROUND

The location of a client device is increasingly used in a variety of ways. For instance, location-based services are increasingly being offered to provide services based upon a location. Such location-based services may be offered for mobile devices and may include indicating a location of a mobile device to others associated with the mobile device (such as via a social media website or application), indicating businesses nearby the mobile device's location as part of a results page in response to a search query, providing information based on the mobile device's location, or delivering third-party content items or coupons based on the location of the mobile device.

SUMMARY

Implementations described herein relate to improving location modeling using validated location data associated with wireless access points. Candidate location data may be validated using transaction data from a transaction data provider. Such validation may include comparing an identifier associated with candidate location data received from a client device to an identifier for a transaction account associated with a transaction from transaction data at a candidate location. Matching transaction data and candidate location data may generate validated location data to be used in generating location models for candidate locations.

One implementation relates to a method for validating candidate location data. The method includes determining candidate location data received from a client device for a candidate location. The candidate location data includes a set of identifiers and signal strengths. The method also includes validating the candidate location data based on transaction data of a transaction data provider. The transaction data is associated with a transaction at the candidate location and includes a transaction identifier. The transaction identifier is associated with a first identifier of the client device. The method further includes generating a location model for the candidate location based, at least in part, on the validated candidate location data.

Another implementation relates to a system for validating candidate location data. The system may include one or more processors and one or more storage devices. The one or more storage devices include instructions that cause the one or more processors to perform several operations. The operations include determining a candidate location data set based on candidate location data received from a set of client devices for a candidate location. The candidate location data includes a set of identifiers and signal strengths. The operations also include validating the candidate location data set based on transaction data of a transaction data provider. The transaction data is associated with one or more transactions at the candidate location and includes transaction identifiers. The transaction identifiers are associated with identifiers of the plurality of client devices. The operations further include generating a location model for the candidate location based, at least in part, on the validated candidate location data set.

Yet a further implementation relates to a computer readable storage device storing instructions that, when executed by one or more processors, cause the one or more processors to perform several operations. The operations include determining candidate location data received from a client device for a candidate location is within a predetermined range for a time that is equal to or exceeds a predetermined time threshold. The candidate location data includes a set of identifiers and signal strengths. The operations also include validating the candidate location data based on transaction data of a transaction data provider. The transaction data is associated with a transaction at the candidate location and includes a transaction identifier. The transaction identifier is associated with a first identifier of the client device. The operations further include generating a location model for the candidate location based, at least in part, on the validated candidate location data.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 3A is an overview of an implementation of a location data record of location data for a client device of FIG. 2;

FIG. 3B is an overview of an implementation of another location data record of location data for another client device of FIG. 2;

FIG. 3C is an overview of an implementation of yet another location data record of location data for yet another client device of FIG. 2;

FIG. 3D is an overview of an implementation of still another location data record of location data for still another client device of FIG. 2;

FIG. 7 is a flow diagram depicting an implementation of a process for generating a location model for a candidate location based on validated location data with discrete location data queries;

FIG. 8 is an overview of an implementation of a transaction data record of transaction data;

Figure 1:
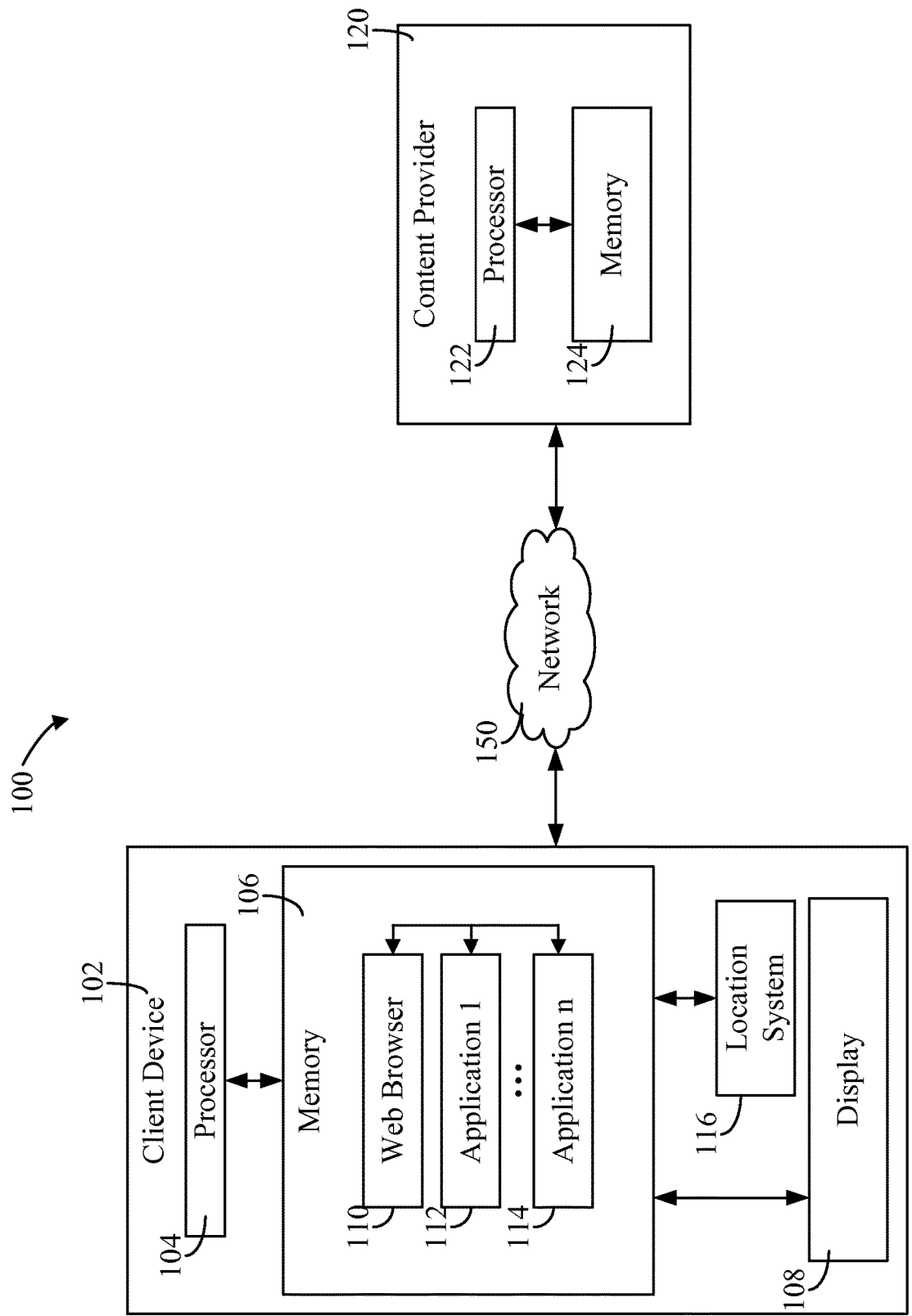
FIG. 1 is a block diagram depicting an implementation of a system for interacting with a client device using location data.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for generating location models for candidate locations based on validated location data. In some implementations, the location models for candidate locations may be based on validated location data associated with wireless access points that is validated using transaction data. The various concepts introduced above and discussed in greater detail below may be implemented in any of numerous ways, as the described concepts are not limited to any particular manner of implementation. Specific implementations and applications are provided primarily for illustrative purposes.

The location of a client device is increasingly used in a variety of ways. For instance, location-based services are increasingly being offered to provide services based upon a location. Such location-based services may be offered for mobile devices and may include indicating a location of a mobile device to others associated with the mobile device (such as via a social media website or application), indicating businesses nearby the mobile device's location as part of a results page in response to a search query, providing information based on the mobile device's location (e.g., providing information or interactivity about a business the client device is currently located in or providing interactive features, such as a menu for conducting a transaction with the business, etc., to the client device for the business the client device is currently located in), or delivering third-party content items or coupons based on the location of the mobile device. Such location-based services may be based on a business entity associated with the location of the client device and may be served over a network, such as the Internet, in order to make such services available.

In some implementations, a global positioning system (GPS) may be used to determine the location of a client device via a GPS chipset of the client device. In some instances, the GPS location of a client device may be inaccurate or unable to be determined based on the location of the client device (e.g., inside a building, underground, etc.). For instance, a GPS reading may be inaccurate based on a lapse in time from when the client device was last able to receive GPS data. That is, the last GPS reading when a client device enters a large building, such as a mall or an underground facility, may be inaccurate and still registering the client device as located at the entrance despite the client device maneuvering within the building. Moreover, while GPS readings may be accurate to a small resolution (e.g., 5-10 meters), such a resolution may still encompass several locations in a small cluster (e.g., a group of stores on a block), thereby making it difficult to resolve the particular location (e.g., a store) into which the client device entered. In such situations, it may be useful to determine the location of a client device through alternative methods.

With the proliferation of wireless access points, the position of a client device may be determined based on the wireless access point that the client device detects, either in addition to or in lieu of GPS coordinates. The detection of the wireless access point may be determined via a scan of available access points or based on the wireless access point with which the client device is connected. In some instances, several wireless access points may be identified by the client device and may be in close proximity such that it may be difficult to determine the location of the client device based on the available access points (e.g., in a downtown portion of a city, inside a mall, along a row of stores, within a single large store with several access points, near multi-unit residential complexes, etc.). Accordingly, it may be useful to determine a model for determining the position of the client device based on the identity of the several wireless access points. In some implementations, the model may be further based on the relative strength of the several wireless access points as measured by the client device.

While such a model may determine a location of a client device, such a model is dependent upon the accuracy of the underlying location data set used to generate the location model. Accordingly, it may be useful to validate the accuracy of the underlying location data. In the instance of business establishment locations, such validation may be determined based upon transactional data associated with the business establishment. That is, location data associated with a client device that is linked to a transaction (e.g., purchase, use of a rewards card, redemption of a coupon, etc.) also associated with the client device at the candidate business establishment may be used to validate the location data as corresponding to the business establishment. A model can then be generated to determine if a client device is within the candidate business establishment based on several sets of validated location data based on the matching of candidate location data with transaction data. Accordingly, such a generated model may determine that a client device is within a candidate business establishment based on the available access points and, in some instances, the relative strength of the several wireless access points as measured by the client device. In some implementations, the candidate location data and transaction data may be accessible to a single system. In other implementations, the candidate location data may be accessible to a first system and the transaction data may be accessible a second, separate system such that one of the candidate location data or the transaction data needs to be transmitted or shared with the other corresponding system.

In addition to generating a model based on the validated location data, non-candidate location data (i.e., location data determined to be located outside the candidate location) may, in some implementations, be used in generating the model by providing negative indicators that a client device detecting an available access point that is part of the non-candidate data is outside of the candidate location associated with the generated model.

In some implementations, such a model may be further generated or refined based on further validated location data, such as location data validated via the client device confirming the location, either directly (e.g., in response to a prompt on the client device) or indirectly (e.g., through a social media post tagged with the location, through a "check-in" at the location, through another entity identifying the client device as located at the location, etc.).

The foregoing generated models can receive location data, such as wireless access point identifiers and signal strengths, and output an indication of whether the client device is located at a candidate location associated with the generated model. That is, the output of the generated location models is an indication of the likelihood that the client device is at the candidate location based on the location data of the client device (e.g., the likelihood of the client device being within a specific business based on a location data profile of MAC addresses and corresponding signal strengths detected by the client device). Thus, the generated location models can directly indicate the likelihood that the client device is at a candidate location based on the location data (e.g., MAC addresses and corresponding signal strengths) without necessarily determining a specific location of the client device.

While the foregoing has provided an overview of validating location data based on transaction data and generating a location model using validated location data, specific implementations for validating location data and/or generating location models will be discussed in greater detail below.

FIG. 1 depicts an implementation of an environment 100 having a client device 102 and a content provider 120. The client device 102 may transmit and receive data from the content provider 120 via a network 150. The network 150 may be any form of computer network that relays information between the client device 102 and the content provider 120. For instance, the network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, smartphones, tablets, mobile phones, etc.) that are configured to receive and/or transmit data within the network 150. The network 150 may further include any number of hardwired and/or wireless connections. For instance, the client device 102 may communicate wirelessly (e.g., via WiFi, cellular, radio, etc.) with a transceiver that is hardwired (e.g., via a fiber optic cable, a CAT5 cable, etc.) to other computing devices in the network 150.

The client device 102 may be any number of different types of electronic devices configured to communicate via the network 150 (e.g., a laptop computer, a desktop computer, a tablet computer, a smartphone, a digital video recorder, a set-top box for a television, a video game console, combinations thereof, etc.). The client device 102 is shown to include a processor 104 and a memory 106. The memory 106 may store machine instructions that, when executed by the processor 104, cause the processor 104 to perform one or more of the operations described herein. The processor 104 may include one or more microprocessors, application specific integrated circuits (ASICs), field programmable gate arrays (FPGAs), other forms of processing circuits, or combinations thereof. The memory 106 may include, but is not limited to, electronic, optical, magnetic, or any other storage or transmission device capable of providing the processor 104 with program instructions. The memory 106 may include storage devices such as a floppy disk, CD-ROM, DVD, magnetic disk, memory chip, ROM, RAM, EEPROM, EPROM, flash memory, optical media, or any other suitable memory from which the processor 104 can read instructions. The processor 104 and the memory 106 may form a data processor.

The client device 102 may include one or more interface devices. An interface device may be any electronic device that conveys data by generating sensory information (e.g., a visualization on a display, one or more sounds, etc.) and/or converts received sensory information into electronic signals (e.g., a keyboard, a mouse, a pointing device, a touch screen display, a microphone, etc.). The one or more interface devices may be internal to the housing of the client device 102 (e.g., a built-in display, microphone, etc.) or external to the housing of the client device 102 (e.g., a monitor connected to the client device 102, a speaker connected to the client device 102, etc.), according to various implementations. For instance, the client device 102 may include an electronic display 108, which may display webpages, interfaces for applications, and/or other displays. In various implementations, the display 108 may be located inside or outside of the same housing as that of the processor 104 and/or the memory 106. For instance, the display 108 may be an external display, such as a computer monitor, television set, or any other stand-alone form of electronic display. In other instances, the display 108 may be integrated into the housing of a laptop computer, mobile device, smartphone, tablet, or other form of computing device having an integrated display.

The client device 102 further includes a location system 116. The location system 116 may include a GPS device to determine a location of the client device 102 via GPS data. In some implementations, the location system 116 may include a WiFi transceiver configured to wirelessly connect to a WiFi access point. The location system 116 may utilize the name, MAC address, signal strength (e.g., RSSI and/or RCPI), and/or other data from the WiFi access point to determine a location of the client device 102. In still other implementations, the location system 116 may receive data corresponding to signal strength from one or more cellular towers such that the location system 116 may determine a location of the client device 102. Still other location systems 116 that are configured to determine a location of the client device 102 may be used.

The client device 102 may store, via the memory 106, and execute, via the processor 104, a web browser 110 and/or one or more applications 112, 114, which may use content provided by the content provider 120. As shown, the client device 102 may include a web browser 110 which is configured to retrieve and display webpages available from content sources, which may be content providers 120, via the network 150 (e.g., a search result webpage of an online search engine, a visited webpage, etc.). The web browser 110 may access a first-party webpage and provide the webpage for presentation on the display 108 of the client device 102. In some instances, the retrieval and display of webpages may use a location-based service provided by the content provider 120. For instance, a search engine accessed via the web browser 110 may include a location-based service to provide a listing or indication of nearby businesses associated with a search query entered into a search field of the search engine. When the client device 102 receives and transmits a search query in a search field of the search engine, a location of the client device 102 may be provided by the client device 102 or requested by the provider of the search engine. The search engine provider, which may be a content provider 120, may utilize the location of the client device 102 to generate and present a list or other indication of nearby businesses associated with the search query with a search results page.

In other implementations, a retrieved first-party webpage may be presented with a third-party content item that is selected based, at least in part, on a location of the client device 102. For instance, the retrieved webpage may include a content tag that causes the web browser 110 to send a content selection request to a content selection service, which may be a content provider 120 or may be associated with a content provider 120. The content selection request may request, for instance, third-party content to be selected and served for presentation in conjunction with the first-party webpage (e.g., as content embedded in the webpage, in a popup window, etc.). In some cases, the content selection request includes a device identifier for the client device 102, such as a cookie set by content selection service 104, a universal device identifier (UDID), a device serial number, a telephone number, and/or a network address. In addition, a location of the client device 102 may be included with the content selection request. The location of the client device 102 may be provided to a content provider 120 to select and serve third-party content based, at least in part, on the location of the client device 102. For instance, the content provider 120 may directly select and serve a third-party content item using the provided location data and/or may permit third parties to submit real-time bids for third-party content items to be selected and served based on a location of the client device 102. Other information that may be included in the content selection request may include a topic of the webpage being accessed by the web browser 110, the address of the webpage being accessed, or other such information. Still other location-based services from content providers 120 may be implemented via the web browser 110 when executed on the client device 102.

The client device 102 may also include non-browser applications 112, 114 (e.g., a first application 112 through nth application 114). In general, the applications 112, 114 differ from the web browser 110 in that the web browser 110 is configured to retrieve webpages in response to a URL specified by the client device 102. In some implementations, the applications 112, 114 may be configured to only retrieve specific webpages, access predefined online services (e.g., the accessed services may be included in the code of the applications 112, 114), launch the web browser 110 to retrieve a webpage, or not use any webpage data at all. For instance, the applications 112, 114 may be communications applications (e.g., email applications, instant messenger applications, etc.), productivity applications (e.g., text editors, software development applications, spreadsheet applications, etc.), social media applications, multimedia players (e.g., music players, movie players, etc.), games, navigation applications, or any other form of application. In some implementations, the applications, 112, 114 may directly access and use a location-based service provided by a content provider 120, such as a social media application with a location feature for "checking in." In other implementations, the applications 112, 114 may directly provide location-based services based on a location of the client device 102. In other implementations, the applications 112, 114 may present third-party content items that are selected based, at least in part, on a location of the client device 102 (e.g., similar to the selection and serving of third-party content items to be presented in conjunction with first-party webpages). Accordingly, the applications 112, 114 may directly or indirectly utilize a location-based service of a content provider 120.

In some instances, the client device 102 may identify itself to the content provider 120 or a content selection service through the use of one or more device identifiers. Device identifiers may include, but are not limited to, cookies, universal device identifiers (UDIDs), device serial numbers, telephone numbers, or network addresses. For instance, the content provider 120 may set a cookie on the client device 102 or associate a UDID with the client device 102 when the client device 102 visits a particular webpage or uses a particular application that accesses a system of the content provider 120. On subsequent webpage visits or executions of the application, the cookie or the UDID may be sent by the client device 102 to the content provider 120, allowing the content provider 120 to attribute the different webpage visits or application executions to the same client device 102.

In situations in which the systems or processes discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how such information is used. In addition, certain data may be treated in one or more ways before it is stored or used, so that personally identifiable information is removed. For instance, a user's identity, a client device identifier, and/or a transaction account identifier may be treated so that no personally identifiable information can be determined for the user, or a user's geographic location may be generalized where location information is obtained (such as to a city, ZIP code, or state level), so that a particular location of a user of a client device cannot be determined. Thus, the user may have control over how information is collected about the user and used by the systems described herein.

The content provider 120 may be one or more electronic devices connected to the network 150 that provides content and/or services (e.g., location-based services) to devices connected to the network 150. For instance, the content provider 120 may be a computer server (e.g., a FTP server, a file sharing server, a web server, etc.) or combination of servers (e.g., data centers, cloud computing platforms, etc.). The content and/or service may be a part of an application, a website, a search engine, a service to deliver third-party content items to the client device 102, and/or other content and/or services. In some implementations, the content and/or service may include or be associated with one or more content items, such as webpage data, a text file, a spreadsheet, images, search results, and other forms of content items. Similar to the client device 102, the content provider 120 may include a processor 122 and a memory 124 that store program instructions executable by the processor 122 to transmit data to the client device 102 via the network 150. For instance, the memory 124 of the content provider 120 may include instructions to execute software, such as web server software, FTP serving software, or other types of software, that cause the content provider 120 to provide the content and/or service via the network 150 to the client device 102.

The content provider 120 provides the content and/or service, either directly or indirectly, to the client device 102. In some implementations, the content provider 120 may directly provide the content and/or service (e.g., a social media webpage or a social media application that provides client devices with a location-based service to "check in" at locations or associates a location with a post of the client device 102). In other implementations, the content and/or service of the content provider 120 may be utilized in conjunction with a content source to provide content and/or a service in conjunction with content from the content source (e.g., the content provider 120 may select and serve a third-party content item or may permit third parties to submit real-time bids for third-party content items to be selected and served based on a location of the client device 102 and to be presented with a first-party content webpage provided by the content source).

Figure 2:
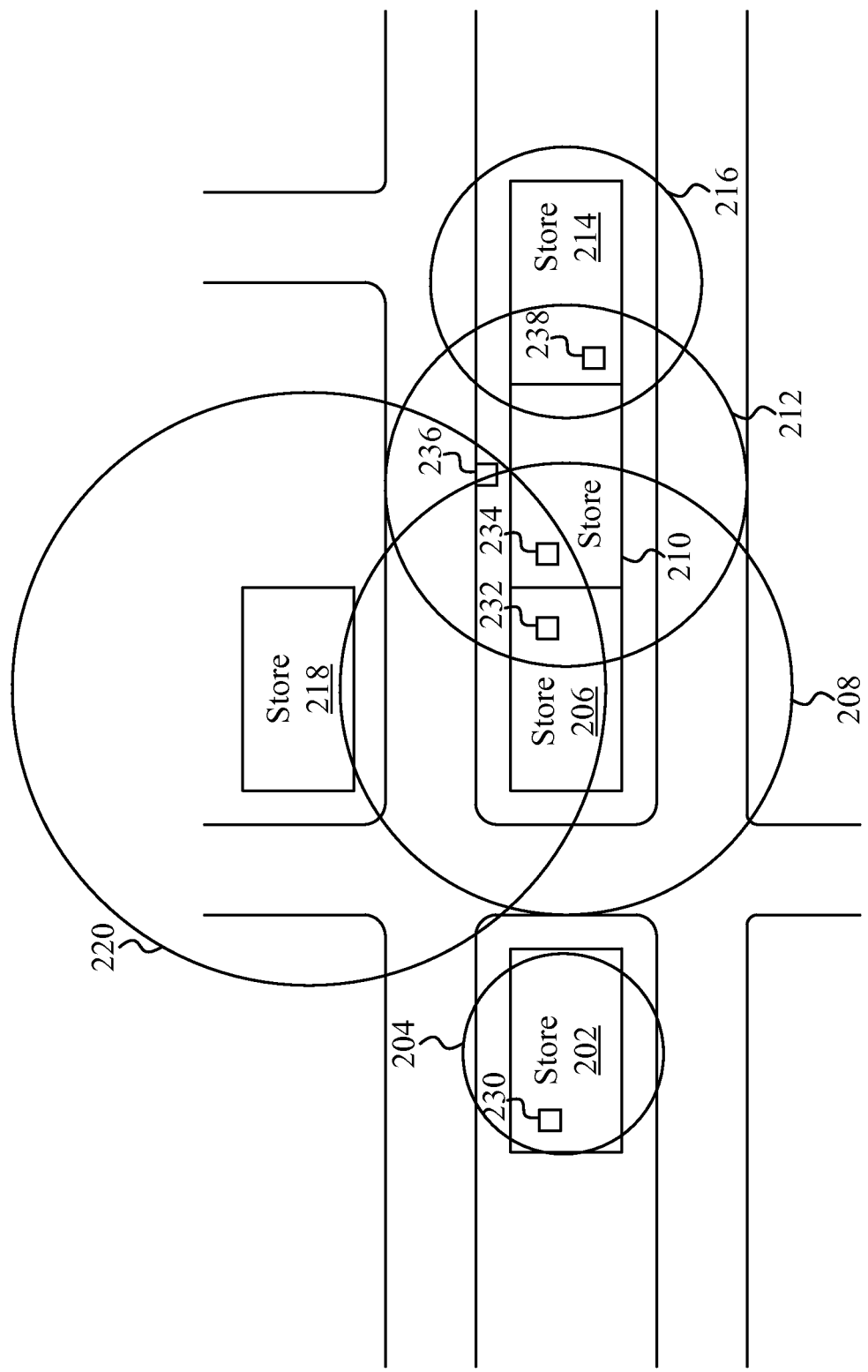
FIG. 2 is an overview diagram depicting several locations, several wireless access point ranges, and several client devices.

FIG. 2 depicts an overview of several locations (e.g., stores 202, 206, 210, 214, 218), several ranges 204, 208, 212, 216, 220 of wireless access points, and several client devices 230, 232, 234, 236, 238 at various locations. The stores at locations 202, 206, 210, 214, 218 may correspond to business establishments or other locations (e.g., public facilities, transportation stations, etc.) that may be known at the various locations via a database correlating latitude and longitude coordinates to each of the stores 202, 206, 210, 214, 218. Thus, a client device receiving GPS data may access or request data from the database correlating latitude and longitude coordinates derived from the GPS data to determine nearby stores 202, 206, 210, 214, 218. In some implementations, the client device may also utilize the MAC addresses as identifiers of the wireless access points detected when the client device is within range 204, 208, 212, 216, 220 of one or more of the wireless access points to assist in determining the latitude and longitude location of the device.

In some instances, such as when a single wireless access point is in range without other wireless access points, it may be possible to directly map a client device to a candidate location. For instance, client device 230, which is within range 204 of the wireless access point, may scan for available wireless access points and detect the wireless access point corresponding to the range 204, which is identified by a corresponding MAC address. FIG. 3A depicts an implementation of a location data record 310 of location data for client device 230. Such location data, if known to correspond to a client device located within store 202, may be used to directly map the detection of the MAC address identifier of the wireless access point of range 204 to the candidate location of store 202. Accordingly, when a subsequent client device detects the same MAC address of the wireless access point of range 204, the location model can determine that the client device is within store 202.

However, when a client device, such as client devices 232, 234, 236, are within range of several wireless access points (e.g., ranges 208, 212, 220), it may be difficult to determine the location of the client device relative to one or more nearby locations, such as within store 206, within store 210, or neither. For instance, client devices 232, 234, 236 each are within ranges 208, 212, 220 of respective wireless access points, but each client device 232, 234, 236 is at a different location. Client device 232 is within store 206, client device 234 is within store 210, and client device 236 is outside and not within either store 206 or store 210. Yet, each client device detects the wireless access point corresponding to the ranges 208, 212, 220, which are each identified by a corresponding MAC address. FIGS. 3B-3D depicts implementations of location data records 320, 330, 340 of location data corresponding to client devices 232, 234, 236. FIGS. 3B-3C depict similar location data records 320, 330 for client devices 232, 234 dwelling within stores 206, 210. FIG. 3D depicts the location data record 340 for client device 236 that is moving along the street relative to stores 214, 210, 206 and detecting various MAC addresses and signal strengths at different times.

To develop a location model that can determine when each client device is within a candidate location, the signal strength of the various wireless access points corresponding to the ranges 208, 212, 220 identified by a corresponding MAC address may be used. That is, if the signal strength for the detected MAC address of the wireless access point of range 220 is between a first predetermined value and a second predetermined value, the signal strength for the detected MAC address of the wireless access point of range 208 is between a third predetermined value and a fourth predetermined value, and the signal strength for the detected MAC address of the wireless access point of range 212 is between a fifth predetermined value and a sixth predetermined value, then the location of a client device can be determined to be within a particular candidate location, such as store 206. Location models can be developed for each candidate location using a corpus of location data (e.g., sets of MAC addresses and signal strengths). Thus, the location models can be developed subject to having a reliable corpus of location data that is known to correspond to the candidate location for which the location model is being developed. That is, there needs to be ground-truth location data that is known to correspond to the candidate location for which the model is being developed. Accordingly, when such location models are developed, subsequent client devices can be determined to be within a candidate location using the developed location model based on one or more detected MAC addresses and signal strength sets.

To develop the ground-truth location data for such location models, candidate location data needs to be validated as within a candidate location. In some implementations, such validation may be done via a client device confirming the location, either directly (e.g., in response to a prompt on the client device) or indirectly (e.g., through a social media post tagged with the location, through a "check-in" at the location, through another entity identifying the client device as located at the location, etc.). In other implementations, the validation of the candidate location data may be validated by correlating a transaction performed at the candidate location with the client device of the candidate location data. That is, location data associated with a client device that is linked to a transaction at the candidate location (e.g., a purchase, a use of a rewards card, a redemption of a coupon, etc.) also associated with the client device may be used to validate the candidate location data as corresponding to the candidate location.

Figure 4:
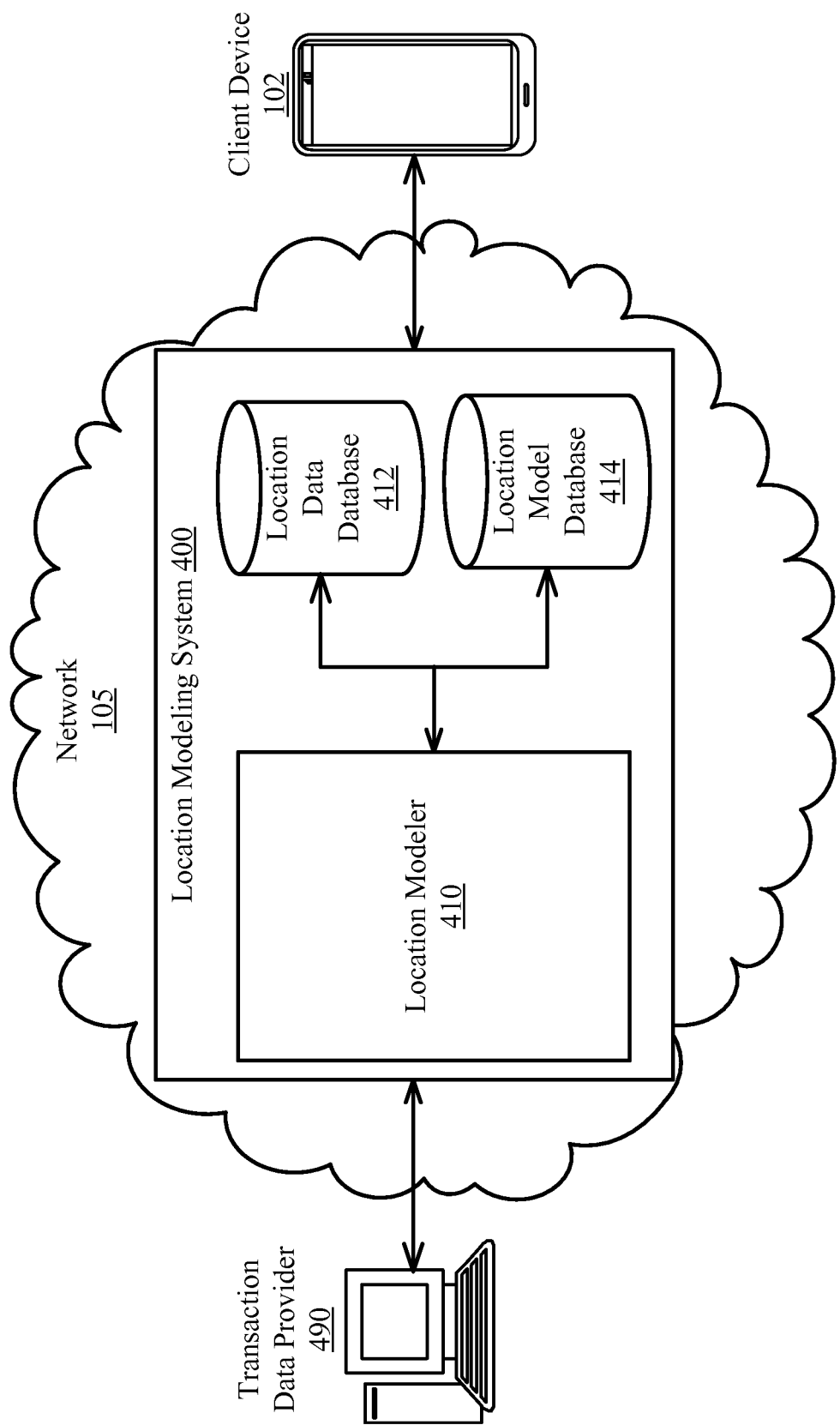
FIG. 4 is a block diagram depicting an implementation of a system for location modeling using location data from several client devices and interacting with a transaction data provider.

FIG. 4 depicts an implementation of a location modeling system 400 for validating candidate location data and for developing location models for candidate locations based on the validated candidate location data. A client device 102 is in communication with the location modeling system 400 and may transmit and receive data from the location modeling system 400 via a network 150. A transaction data provider 490 is also in communication with the location modeling system 400 and may transmit and receive data from the location modeling system 400 via a network 150. In some instances, several client devices 102 and/or transaction data providers 490 may be in communication with the location modeling system 400.

The location modeling system 400 includes a location modeler 410, a location data database 412, and a location model database 414. The location modeling system 400 may be one or more electronic devices connected to the network 150. For instance, the location modeling system 400 may be part of a computer server (e.g., a FTP server, a file sharing server, a web server, etc.) or combination of servers (e.g., data centers, cloud computing platforms, etc.). The location modeling system 400 may include a processor and a memory that store program instructions executable by the processor to transmit and/or receive data to the client device 102 and/or transaction data provider 490 via the network 150. In some implementations, the location modeling system 400 may be part of and/or associated with a content selection and serving system, such as an advertisement server.

The location modeling system 400 includes a location data database 412 for storing location data. For instance, the location modeling system 400 may store all location data received by the location modeling system 400 in the location data database 412. In other implementations, if candidate location data is not validated, the non-validated candidate location data may be eliminated from the location data database 412 and/or stored as non-candidate location data, as will be described in greater detail herein.

The location modeler 410 is configured to receive location data and to generate one or more location models for a candidate location based on the location data. The location modeler will be described in greater detail herein. The one or more location models may be stored in the location model database 414 to be retrieved responsive to the location modeling system 400 receiving subsequent location data for a generated location model and/or the one or more location models may be transmitted to one or more client devices 102 responsive to a request from the one or more client devices.

The transaction data provider 490 may be a credit card transaction data provider, a debit card transaction data provider, a rewards card transaction data provider, a candidate location having transaction data, or any other data provider that can supply data associated with a candidate location to validate candidate location data. Transaction data, such as credit card transaction data, may be used to ground-truth the candidate location data by matching candidate location data of a client device with a transaction that can be associated with the client device. That is, a client device may detect a set of MAC addresses and signal strengths at time T. Such a set of MAC addresses and signal strengths are the candidate location data. The transaction data provider 490 may have a transaction performed by a user of the client device at time T+5 at the candidate location. In some implementations, the matching of the candidate location data from the client device with the transaction may be associated directly (e.g., via linking a transaction account identifier with the client device) or indirectly (e.g., based on a common identifier such as an e-mail address, a login name, etc. associated with the client device and the transaction data). In some implementations, a common pseudorandom identifier may be associated with an identifier of the location modeling system 400 for the client device and an identifier of the transaction data provider 490 for the transaction account such that the common pseudorandom identifier is the only identifier used when validating candidate location data.

The client device identifier and the transaction account identifier discussed herein identify only a client device and a transaction account, respectively. A user of a client device may be provided with an opportunity to control whether programs or features collect user information (e.g., a client device's current location) or to control whether and/or how such information is used. In addition, certain data may be treated in one or more ways before it is stored or used, so that personally identifiable information is removed. For instance, the client device identifier and the transaction account identifier may be treated so that no personally identifiable information can be determined for the user. Thus, the user may have control over how information is collected about the client device and/or the transaction account and used by the systems described herein.

By matching the transaction data for the transaction to the candidate location data, the candidate location data is validated as known to have occurred within the candidate location. A corpus of validated location data can then be used to generate one or more location models for the candidate location that can determine whether an observed set of location data (e.g., MAC addresses and signal strengths) is within the candidate location or not.

Figure 5:
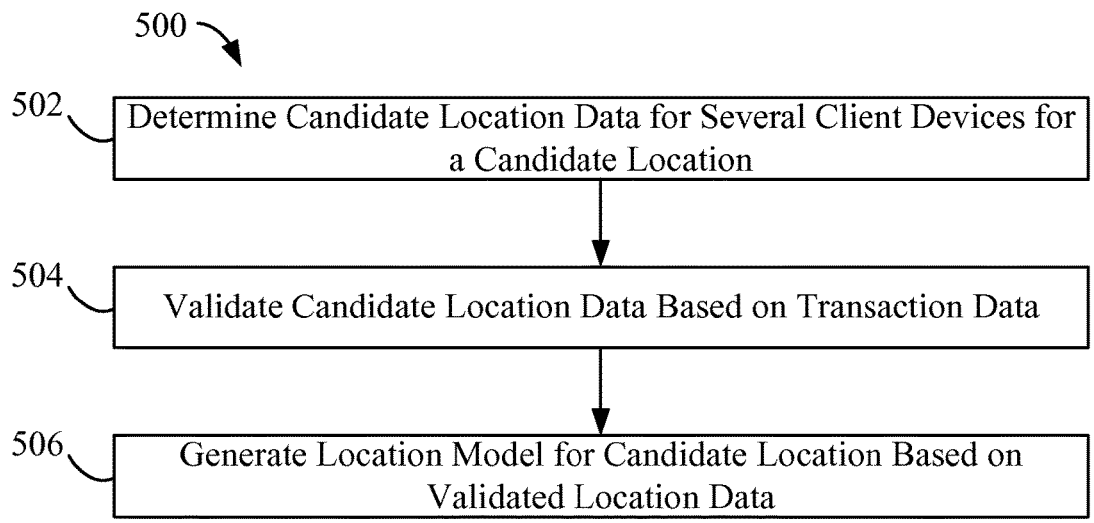
FIG. 5 is a flow diagram depicting an implementation of a process for generating a location model for a candidate location based on validated location data.

FIG. 5 depicts an implementation of a process 500 for generating a location model for a candidate location based on validated location data. The process 500 includes determining candidate location data for several client devices for a candidate location (block 502). In some implementations, the determination of candidate location data may be performed by receiving candidate location data from several client devices. The candidate location data may be transmitted from one or more client devices 102 to the location modeling system 400 periodically or in response to a request from the location modeling system 400. Client devices 102 may opt-in to allow such collection of candidate location data by the location modeling system 400. The candidate location data may include one or more tuples of MAC addresses, signal strengths, and timestamps. The candidate location data may be part of a location data record, such as location data records 310, 320, 330, 340 of FIGS. 3A-3D. In some implementations, the candidate location data or location data records may be transmitted from the client device to the location modeling system 400 periodically, such as every 5 minutes, 10 minutes, 30 minutes, 60 minutes, 2 hours, 6 hours, 12 hours, daily, weekly, monthly, bi-monthly, 3 months, 6 months, yearly, etc. In some instances, a filter may reduce the frequency in response to a known location of the client device (e.g., when a client device is located at a home or work location, then the frequency of transmitting the candidate location data may be reduced). Determining the candidate location data for several client devices for a candidate location (block 502) may also include filtering of the received location data to determine candidate location data by eliminating extraneous location data.

The process 500 further includes validating the candidate location data based on transaction data (block 504). In some implementations, a candidate location identifier (e.g., an identifier for a business) and an identifier associated with the client device from which the candidate location data is received may be used for validation using transaction data of the transaction data provider. In some implementations, the identifier associated with the client device may be a common pseudorandom identifier associated with an identifier of client device from which the candidate location data is received and also associated with an identifier associated with a transaction account for the transaction data such that the common pseudorandom identifier is the only identifier used when validating candidate location data. In some implementations, the common pseudorandom identifier may be generated by a trusted third-party service with a mapping of the common pseudorandom identifier to the identifier of client device provided to the location modeling system and a mapping of the common pseudorandom identifier to the identifier associated with the transaction account for the transaction data provided to the transaction data provider. The validating of the candidate location data based on transaction data will be described in greater detail below in reference to FIGS. 7-11.

The process 500 further includes generating a location model for a candidate location based on the validated location data (block 506). That is, once ground-truth location data is known to correspond to the candidate location, a location model may be generated, such as via the location modeler 410 of the location modeling system 400. In some implementations, the generated location model may be further based on negative indicator and/or non-candidate location data (i.e., location data known to not correspond to the candidate location).

Figure 6:
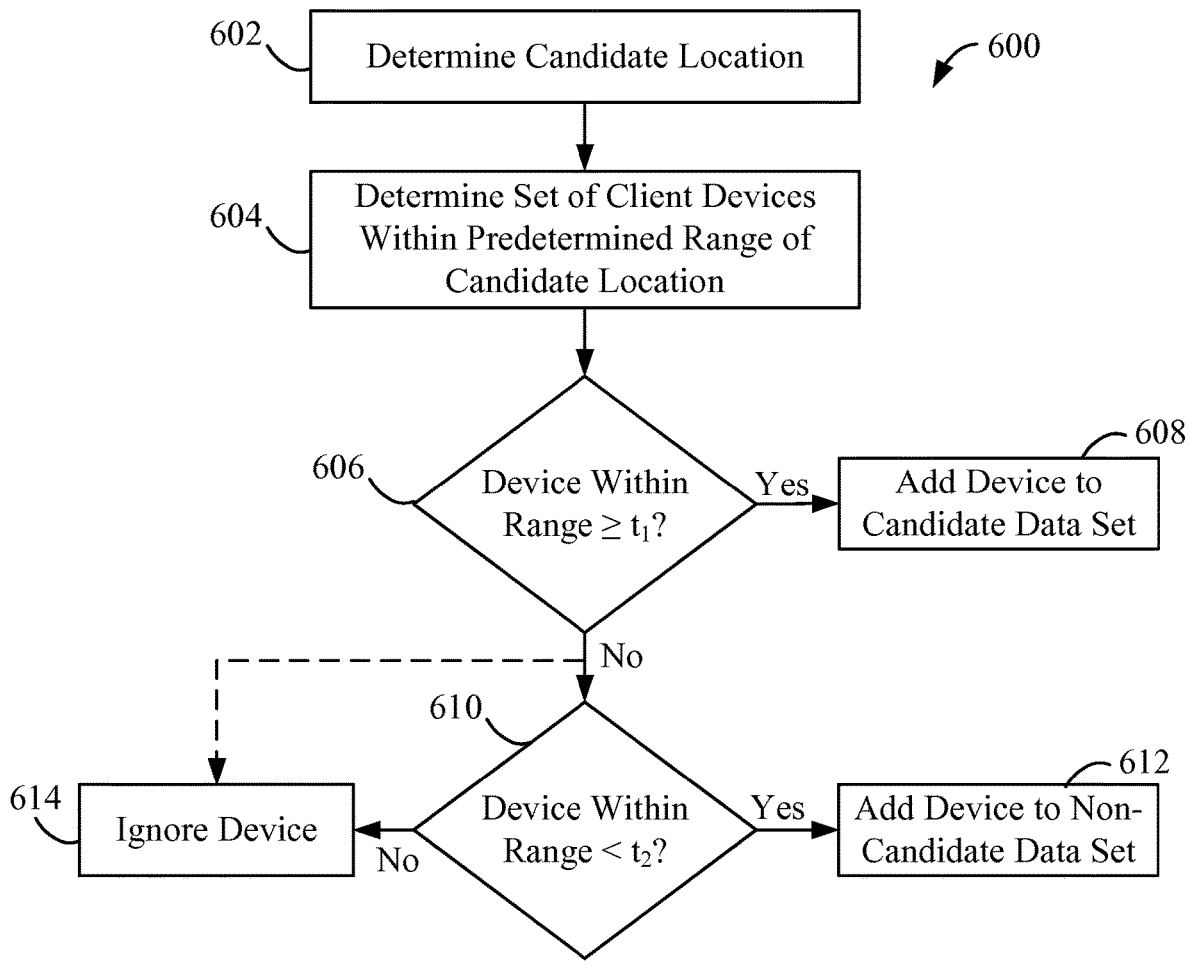
FIG. 6 is a process diagram of an implementation of a process for generating candidate location data set for a candidate location.

FIG. 6 depicts an implementation of a process 600 for generating a candidate location data set for a candidate location. The process 600 may be implemented during the determining of candidate location data for several client devices for a candidate location (block 502) of process 500. The process 600 includes determining a candidate location (block 602). A candidate location may be a business establishment, such as stores 202, 206, 210, 214, 218 of FIG. 2, or any other candidate location with which transaction data from a transaction data provider may be associated. Determining a candidate location may include identifying the candidate location based on latitude and longitude coordinates from a database correlating latitude and longitude coordinates derived from the GPS data with known candidate locations. In other implementations, the candidate location may be specified (e.g., by a selection received by the location modeling system and/or sequentially in a list of candidate locations) or randomly selected.

Using the latitude and longitude coordinates for the determined candidate location, a set of client devices within a predetermined range of the candidate location are determined (block 604). That is, from a set of location data received from client devices that may be stored in the location data database 412, a subset of client devices may be determined based on each client device having associated location data that is within a predetermined distance from the latitude and longitude coordinates of the candidate location. The predetermined distance may be a fixed distance (e.g., 100 meters, 50 meters, 20 meters, etc.) or the predetermined distance may be dependent upon the candidate location (e.g., the predetermined distance may be larger for large candidate locations, such as a large retailer, or smaller for small candidate locations, such as a small shop). In some implementations, determining the set of client devices may be further based on the location data from the client device being within a predetermined look-back window, such as the past 1 day, 2 days, 3 days, 4 days, 5 days, 6 days, 7 days, 10 days, 2 weeks, 3 weeks, month, 2 months, 3 months, 6 months, year, etc.

The process 600 further includes determining whether each client device of the determined subset of client devices has a dwell time within the predetermined distance greater than or equal to a predetermined time, $t_1$ (block 606). The predetermined time $t_1$ may be a time of 1 minute, 2 minutes, 3 minutes, 4 minutes, 5 minutes, 10 minutes, 15 minutes, 20 minutes, 30 minutes, 1 hour, etc. The predetermined time $t_1$ may be determined based on historical data for how long an average transaction takes at the candidate location. For instance, the time $t_1$ for a candidate location of a coffee shop may be 2-3 minutes as the typical transaction is brief. In other instances, the time $t_1$ for a candidate location of a dinner restaurant or department store may be longer, such as 15-20 minutes, as the typical transaction time is lengthier. The dwell time may be determined based on the difference between timestamps of a first candidate location data having a first set of MAC addresses and a second candidate location data having a second set of MAC addresses, where the second set of MAC addresses differs from the first set of MAC addresses. Intervening candidate location data having the same MAC addresses as the first set of MAC addresses may be considered to be within the dwell time (e.g., even if the signal strength for a set of MAC addresses changes, until a candidate location data with a new MAC address occurs or a candidate location data missing a MAC address from the first set of MAC addresses occurs, the client device can be considered to be substantially in the same location. For instance, as shown in FIG. 3C, the dwell time can be determined to be approximately 8 minutes based on the difference between the first time stamp and the last time stamp, where the last time stamp no longer has the same set of MAC addresses. If a client device of the determined subset of client devices is determined to have a dwell time within the predetermined distance greater than or equal to the predetermined time $t_1$, then the client device and the associated candidate location data are added to the candidate location data set (block 608).

If the client device of the determined subset of client devices is determined to have a dwell time within the predetermined distance less than the predetermined time $t_1$, then the process 600 proceeds to determine whether the client device of the determined subset of client devices has a dwell time within the predetermined distance less than a predetermined time, $t_2$ (block 610). The predetermined time $t_2$ may be a time of 30 seconds, 1 minute, 2 minutes, 3 minutes, 4 minutes, 5 minutes, 10 minutes, 15 minutes, 20 minutes, 30 minutes, 1 hour, etc. The predetermined time $t_2$ may be determined based on historical data for how long an average transaction takes at the candidate location. For instance, the time $t_2$ for a candidate location of a coffee shop may be 1 minute as the typical transaction is brief. In other instances, the time $t_2$ for a candidate location of a dinner restaurant or department store may be longer, such as 5 minutes, as the typical transaction time is lengthier. If a client device of the determined subset of client devices is determined to have a dwell time within the predetermined distance less than the predetermined time $t_2$, then the client device and the associated candidate location data are added to the negative indicator or non-candidate location data set (block 612). That is, the client device likely was only transitorily near the candidate location (e.g., passing by outside), and the observed location data is indicative of the client device not being located within the candidate location. Thus, the negative indicator or non-candidate location data may be used when generating a location model for the candidate location as negative indicators.

If the client device of the determined subset of client devices is determined to have a dwell time within the predetermined distance greater than the predetermined time $t_2$, then the client device and the associated candidate location data are ignored as inconclusive (block 614). That is, the client device and the observed location data may indicate the client device entering the candidate location and leaving, the client device waiting a short period of time outside of the candidate location, and/or other situations.

In some implementations, the process 600 may proceed to ignore the client device and the associated candidate location data (block 614) if the client device of the determined subset of client devices is determined to have a dwell time within the predetermined distance less than the predetermined time $t_1$ (block 606).

FIG. 7 depicts an implementation of a process 700 for generating a location model for a candidate location based on validated location data with discrete location data queries. The process 700 includes determining candidate location data for several client devices for a candidate location (block 702). The determination of the candidate location data for several client devices for a candidate location may be based on process 600 of FIG. 6. In other implementations, the determination of the candidate location data for several client devices for a candidate location may be done via a selection received by the location modeling system.

A query for a transaction data provider for each candidate location data of a set of determined candidate location data is generated (block 704). That is, candidate location data associated with a timestamp T may be received from a client device A. Additional information may indicate that the client device A is near a known location of a candidate location, such as Company 1 (e.g., based on GPS data, WiFi MAC address information, and/or data from a database of known latitudes and longitudes of locations). A query may be generated to be transmitted to the transaction data provider representative of a query of "Item 5771: Did ID of client device A have a transaction with Company 1 around Time T?" In some instances, the "around time T" may be a time range, such as T±1 minute, T±2 minutes, T±3 minutes, T±4 minutes, T±5 minutes, T±10 minutes, etc. The time range may be based on an average transaction time for the candidate location and/or for a category of the candidate location. The query may be simplified to a line in a data feed of "#5771, ID of client device A, ID Company 1, $T_1$, $T_2$," where $T_1$ and $T_2$ are the bounds for the time range. As noted above, the identifier associated with the client device may be a common pseudorandom identifier associated with an identifier of client device from which the candidate location data is received and also associated with an identifier for a transaction account associated with the transaction data such that the common pseudorandom identifier is the only identifier used when validating candidate location data. In some implementations, the identifier for the candidate location of Company 1 may also be a pseudorandom identifier and/or a common identifier shared by the location modeling system and the transaction data provider (e.g., CID #123456789 or Company1Store #237).

The generated query is transmitted to the transaction data provider (block 706). Each generated query may be transmitted as generated and/or a batch of generated queries may be transmitted to the transaction data provider (e.g., batches of 100 queries, 1000 queries, 10,000 queries, 100,000 queries, etc). The transmitted queries are transmitted via the network 150 to the transaction data provider. In some implementations, the queries may be encrypted or otherwise encoded to obscure the data of the query. In some implementations, the generated queries may be transmitted as part of a data feed to the transaction data provider.

A validation response responsive to the transmitted query is received (block 708). For instance, the transaction data provider may respond with a response validating the query or not validating the query (e.g., a 1 for yes, a 0 for no such that the response may be "#5771, 1" indicating a positive response for query #5771). A system of the transaction data provider may determine if any transactions within the specified time range have a corresponding identifier associated with the client device provided in the received query. If no transaction within the specified time range has the corresponding identifier associated with the client device provided in the received query, then the system of the transaction data provider may output a validation response indicating that there is no match, such as "#5771, 0."

If the corresponding identifier associated with the client device provided in the received query is identified in the transaction data of the specified time range, then the system of the transaction data provider may determine if the identifier for the candidate location corresponds to the identifier for the company of the transaction data. If the identifier for the candidate location in the received query does not correspond to the identifier for the company of the transaction data, then the system of the transaction data provider may output a validation response indicating that there is no match, such as "#5771, 0." If the identifier for the candidate location in the received query does correspond to the identifier for the company of the transaction data, then the system of the transaction data provider may output a validation response indicating that there is a match, such as "#5771, 1." FIG. 8 depicts an implementation of a transaction data record 810 of transaction data for the transaction data provider that includes a series of timestamps, identifiers for the company of each transaction, and identifiers for a transaction account associated with each transaction. As noted above, in some implementations, a pseudorandom identifier may be included in the query and the transaction data provider may determine the corresponding identifier for a transaction account based on a mapping of the pseudorandom identifier to the transaction account identifier used by the transaction data provider. Thus, no personally-identifiable information (PII) may be transmitted between the location modeling system and the transaction data provider.

If there is no match based on the validation response, the process 700 may repeat by generating a new query based on a different candidate location (e.g., Company 2) and/or based on different candidate location data (block 704).

Responsive to receiving a positive validation response from the transaction data provider, the candidate location data may be added to a validated location data set (block 710). That is, the location data (e.g., sets of MAC addresses and signal strengths) may be added to a validated location data set associated with the candidate location. The validated location data set may be stored in the location data database 412 of the location modeling system 400 of FIG. 4. In other implementations, if a non-validation response from the transaction data provider is received, the candidate location data may be removed or deleted from the candidate location data set to result in a validated location data set. A non-validation response may indicate that no transaction occurred because the client device was not located in the candidate location, no transaction occurred because the user of the client device did not perform a transaction, and/or no transaction occurred because a different transaction system other than the transaction data provider was used.

In some implementations, the process 700 may repeat by generating a new query based on a different candidate location (e.g., Company 2) and/or based on different candidate location data (block 704).

The process 700 generates a location model for a candidate location based on the validated location data set (block 712). In some implementations, the location model for a candidate location may be generated once a predetermined number of validated location data has been added to the validated location data set (e.g., a minimum of 10, 20, 50, 100, 500, 1,000, 5,000, 10,000, etc.). In other implementations, the location model for a candidate location may be generated once all candidate location data has been validated or not validated by the transaction data provider. The generation of the location model for a candidate location may be done by a location modeler, such as location modeler 410 of FIG. 4, executing a machine learning algorithm, such as a regression learning algorithm, and using the validated location data. Implementations of such regression learning algorithms include perceptron linear learning, maximum entropy logistic regression, support vector machine (SVM) regression with maximum entropy gradient, descent least-squares stochastic gradient, etc.

In some implementations, candidate location data may be used to generate multiple queries, such as two queries for two different candidate locations (e.g., for Company 1 and Company 2 that within a similar area). Such multiple queries may be generated sequentially or concurrently. For instance, candidate location data associated with a timestamp T may be received from a client device A. Additional information may indicate that the client device A is near a known location of Company 1 and Company 2 (e.g., based on GPS data, WiFi MAC address information, and/or data from a database of known latitudes and longitudes of locations). Queries may be generated to the transaction data provider for each candidate location, such as "Item 5771: Did ID of client device A have a transaction with Company 1 around Time T?" and "Item 5772: Did ID of client device A have a transaction with Company 2 around Time T?" In some instances, the "around time T" may be a time range, such as T±1 minute, T±2 minutes, T±3 minutes, TA minutes, T±5 minutes, T±10 minutes, etc. Such queries may be simplified to lines in a data feed of "#5771, ID of client device A, Company 1, $T_1$, $T_2$" and ""#5772, ID of client device A, Company 2, $T_1$, $T_2$," where $T_1$ and $T_2$ are the bounds for the time range.

The transaction data provider may respond with a response validating each query or not validating each query, such as "#5771, 1; #5772, 0," where 1 corresponds to a validation of the query and a 0 is a non-validation. In such an instance, the candidate location data can be associated with the validated location data for the candidate location of Company 1. In some implementations, the candidate location data may also be associated with a data set for the candidate location of Company 2 that may be used as a negative indicator (e.g., the location model for candidate location of Company 2 may use the negative indicators to build the model to indicate a client device is not at Company 2 when the location data is the same or similar to the negative indicating location data). If the response from the transaction data provider is "#5771, 0; #5772, 1," then the candidate location data can be associated with the validated location data for the candidate location of Company 2. Similarly, the candidate location data may also be associated with a data set for the candidate location of Company 1 that may be used as a negative indicator (e.g., the location model for candidate location of Company 1 may use the negative indicators to build the model to indicate a client device is not at Company 1 when the location data is the same or similar to the negative indicating location data).

If the response from the transaction data provider is "#5771, 0; #5772, 0," then the candidate location data may be associated with the location data for both the candidate location of Company 1 and the candidate location of Company 2 as possibly associated with each. In some implementations, the relative frequency of validated location data to possible location data may be indicative of which aspects of the location data uniquely identify the candidate location of Company 1 relative to the candidate location of Company 2. In other implementations, if the response from the transaction data provider is "#5771, 0; #5772, 0," then the candidate location data can be discarded as inconclusive.

Figure 9:
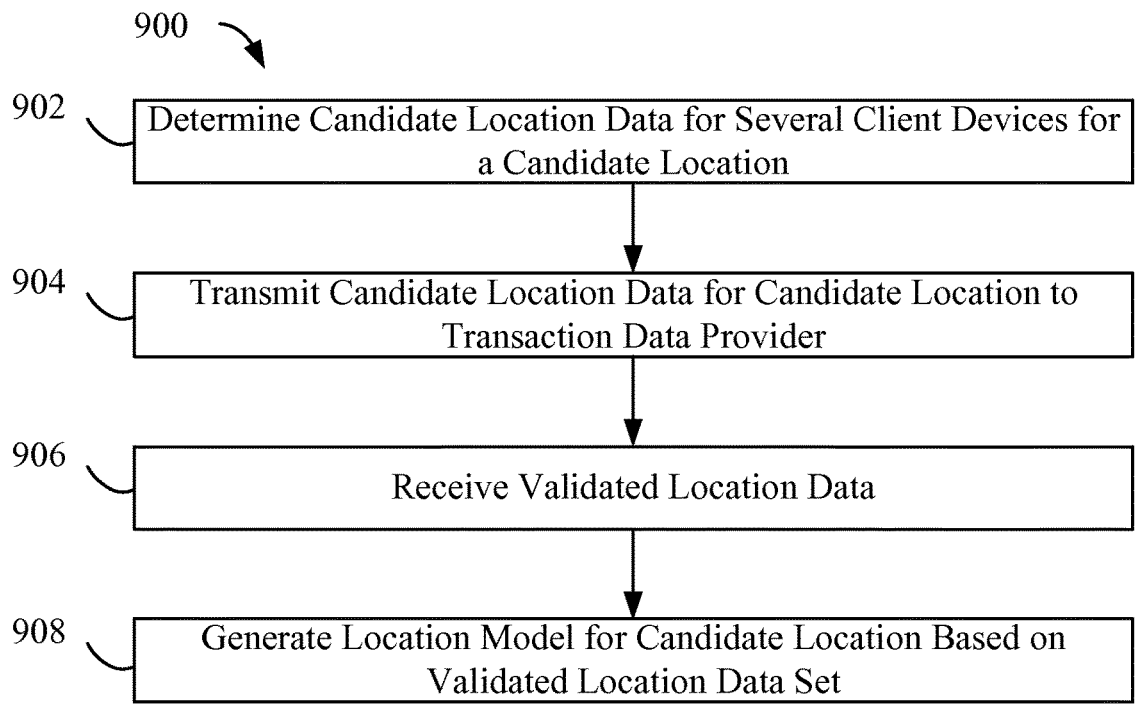
FIG. 9 is a flow diagram depicting an implementation of a process for generating a location model for a candidate location based on validated location data by transmitting candidate location data to a transaction data provider.

FIG. 9 depicts another implementation of a process 900 for generating a location model for a candidate location based on validated location data by transmitting candidate location data to a transaction data provider. The process 900 includes determining candidate location data for several client devices for a candidate location (block 902). The determination of the candidate location data for several client devices for a candidate location may be based on process 600 of FIG. 6. In other implementations, the determination of the candidate location data for several client devices for a candidate location may be done via a selection received by the location modeling system.

Candidate location data for a candidate location may be transmitted to the transaction data provider (block 904). In some implementations, a set of candidate location data (e.g., MAC addresses and signal strengths) may be included in the query to the transaction data provider to validate the candidate location data based on transaction data. The query may then be, for instance, "#5771, ID of client device A, ID Company 1, $T_1$, $T_2$, Candidate Location Data Set 1, Candidate Location Data Set 2, etc." where each candidate location data set includes each MAC address, signal strength, and timestamp for the candidate location data set. In some implementations the signal strength may be quantized or bucketized (e.g., a value of 1 through 5, a value of 1 through 10, etc.). The query transmitted to the transaction data provider may be:

Query ID
Company 1 ID
ID associated with the Client Device
Timeframe $T_1$, $T_2$
Candidate Location Data Set 1
   MAC Address 1
   Signal strength 1
   TimeStamp 1
   MAC Address 2
   Signal Strength 2
   TimeStamp 2, etc.
Candidate Location Data Set 2, etc.

Validated location data may be received by the location modeling system (block 906). That is, the transaction data provider may respond with an aggregated response indicating the validated location data based on matching transaction data and the number of times each validated location data corresponded with a transaction. A system of the transaction data provider may determine if any transactions within the specified time range have a corresponding identifier associated with the client device and the corresponding identifier for the candidate location in the transaction data. The system of the transaction data provider aggregates the occurrences of each match and transmits a response including the aggregated validated location data. That is, the response from the transaction data provider may be: Query ID Company 1 ID
Validated Location Data Set
   MAC Address 1
   Signal strength 1
   Count 1
   MAC Address 2
   Signal Strength 2
   Count 2, etc.

Thus, the received MAC addresses, signal strengths, and the counts of the occurrences may be added to the validate location data set for generating a location model for the candidate location. In some implementations, a threshold occurrence value may be used to filter out validated location data with minimal occurrences (e.g., excluding the MAC address and signal strength from the validated location data if the count is below 2, 3, 4, 5, 10, etc.). The validated location data (e.g., sets of MAC addresses and signal strengths) may be added to a validated location data set associated with the candidate location. The validated location data set may be stored in the location data database 412 of the location modeling system 400 of FIG. 4. In some implementations, non-validated location data may be removed or deleted from a set of candidate location data set to result in a validated location data set.

The process 900 generates a location model for a candidate location based on the validated location data set (block 908). In some implementations, the location model for a candidate location may be generated once a predetermined number of validated location data has been added to the validated location data set (e.g., a minimum of 10, 20, 50, 100, 500, 1,000, 5,000, 10,000, etc.). In other implementations, the location model for a candidate location may be generated once all candidate location data has been validated or not validated by the transaction data provider. The generation of the location model for a candidate location may be done by a location modeler, such as location modeler 410 of FIG. 4, executing a machine learning algorithm, such as a regression learning algorithm, and using the validated location data. Implementations of such regression learning algorithms include perceptron linear learning, maximum entropy logistic regression, support vector machine (SVM) regression with maximum entropy gradient, descent least-squares stochastic gradient, etc.

In some implementations, several identifiers associated with client devices and several candidate location data sets for the several identifiers associated with client devices may be included in the query. In some further implementations, dummy identifiers associated with client devices and/or dummy candidate location data may be included in the query. As noted above, the identifier for the client devices may be a common pseudorandom identifier associated with an identifier of the candidate location data and associated with an identifier for a transaction account of the transaction data such that the common pseudorandom identifier is the only identifier used when validating candidate location data. In some implementations, the common pseudorandom identifier may be generated by a trusted third-party service with a mapping of the common pseudorandom identifier to the identifier associated with the candidate location data provided to the location modeling system and a mapping of the common pseudorandom identifier to the identifier for a transaction account associated with the transaction data provided to the transaction data provider. In some implementations, the MAC address and/or signal strength may be encoded prior to being transmitted in a query to the transaction data provider.

Figure 10:
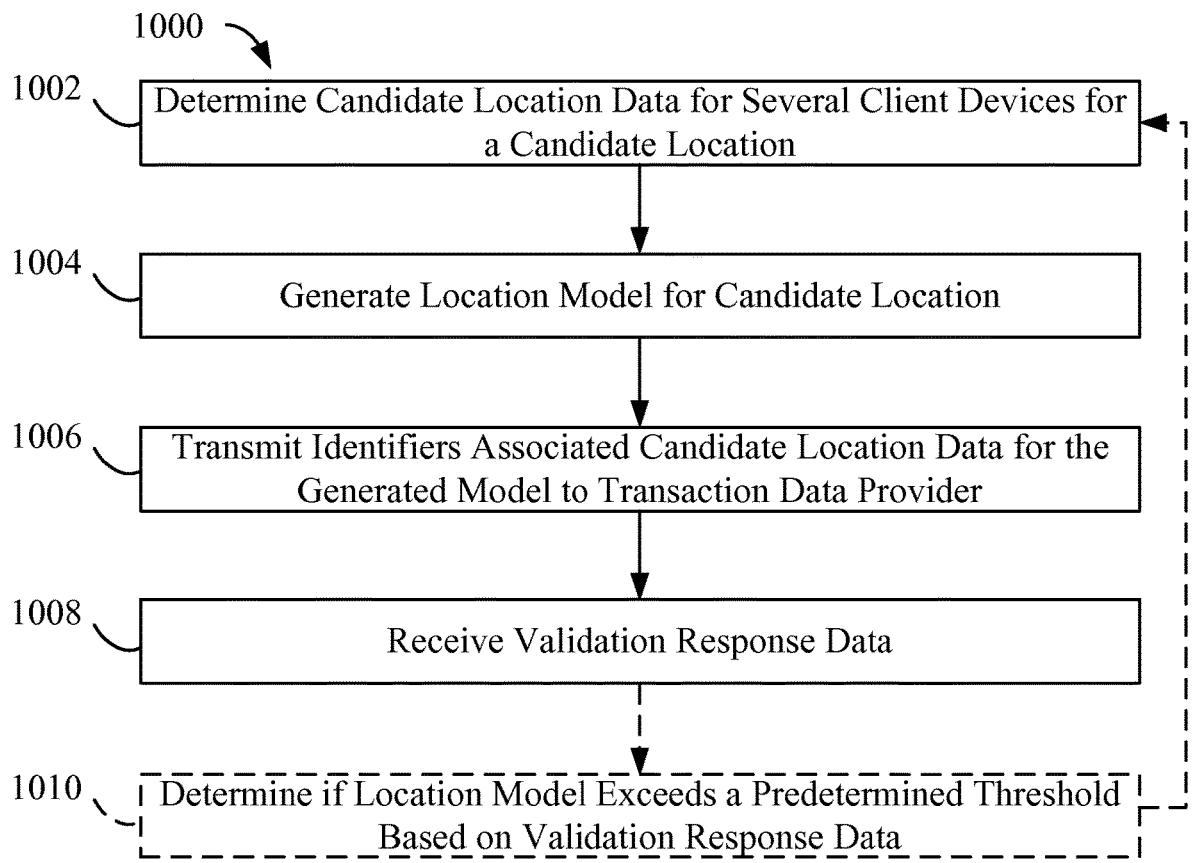
FIG. 10 is a flow diagram depicting an implementation of a process for receiving validation data for candidate location data for a generated model.

FIG. 10 depicts an implementation of a process 1000 for receiving validation data for candidate location data for a generated model. The process 1000 includes determining candidate location data for several client devices for a candidate location (block 1002). The determination of the candidate location data for several client devices for a candidate location may be based on process 600 of FIG. 6. In other implementations, the determination of the candidate location data for several client devices for a candidate location may be done via a selection received by the location modeling system.

The process 1000 generates a location model for a candidate location based on the candidate location data (block 1002). In some implementations, the location model for a candidate location may be generated once a predetermined number of candidate location data has been received (e.g., a minimum of 10, 20, 50, 100, 500, 1,000, 5,000, 10,000, etc.). The generation of the location model for a candidate location may be done by a location modeler, such as location modeler 410 of FIG. 4, executing a machine learning algorithm, such as a regression learning algorithm, and using the candidate location data. Implementations of such regression learning algorithms include perceptron linear learning, maximum entropy logistic regression, support vector machine (SVM) regression with maximum entropy gradient, descent least-squares stochastic gradient, etc.

The set of identifiers associated with the client devices (or common pseudorandom identifiers) associated with the candidate location data used to generate the location model may be transmitted to the transaction data provider (block 1006). That is, an aggregated query may be generated and sent to the transaction data provider, such as transaction data provider 490, that includes an identifier for the query (e.g., #6234), sets of identifiers associated with the client devices (or common pseudorandom identifiers) associated with the candidate location data used to generate the location model and a time range associated with the candidate location data (e.g., PID #3421, $T_1$, $T_2$, PID #4362, $T_3$, $T_4$, etc.), and an identifier for the candidate location (e.g., CID #123456789 or Company1Store #237).

Responsive to the query transmitted to the transaction data provider, validation response data may be received by the location modeling system (block 1008). For instance, the transaction data provider may compare the sets of identifiers associated with the client devices (or common pseudorandom identifiers), the associated time ranges, and the identifier for the company to the transaction data and determine a number of matches found in the transaction data. The transaction data provider may output the validation response data indicating a number of matches (e.g., 20 matching transactions). The received response may be, for instance, "#6234, 20" indicating 20 matching transactions for the query #6234.

The validation response data may be used to evaluate the accuracy of the generated location model (block 1004). For instance, the location modeling system may determine if the location model exceeds a predetermined threshold based on the validation response data (block 1010). That is, if the query included 1000 sets of identifiers associated with the client devices (or common pseudorandom identifiers) and associated time ranges, then the accuracy with 20 matching transactions may be determined to be 2 percent. The determined accuracy may be compared to a predetermined threshold, such as 0.5 percent, 1 percent, 2 percent, 5 percent, 10 percent, 15 percent, 20 percent, etc. If the determined accuracy exceeds the predetermined threshold, the candidate location data may, in some implementations, be added to a validated location data set for generating future location models for the candidate location. In other implementations, if the determined accuracy exceeds the predetermined threshold, the location model may be stored in the location model database 414 and/or otherwise used as a substantially accurate location model. If the determined accuracy is below the predetermined threshold, then the process 1000 may determine a different set of candidate location data (block 1002), such as be eliminating a predetermined number of candidate location data.

Figure 11:
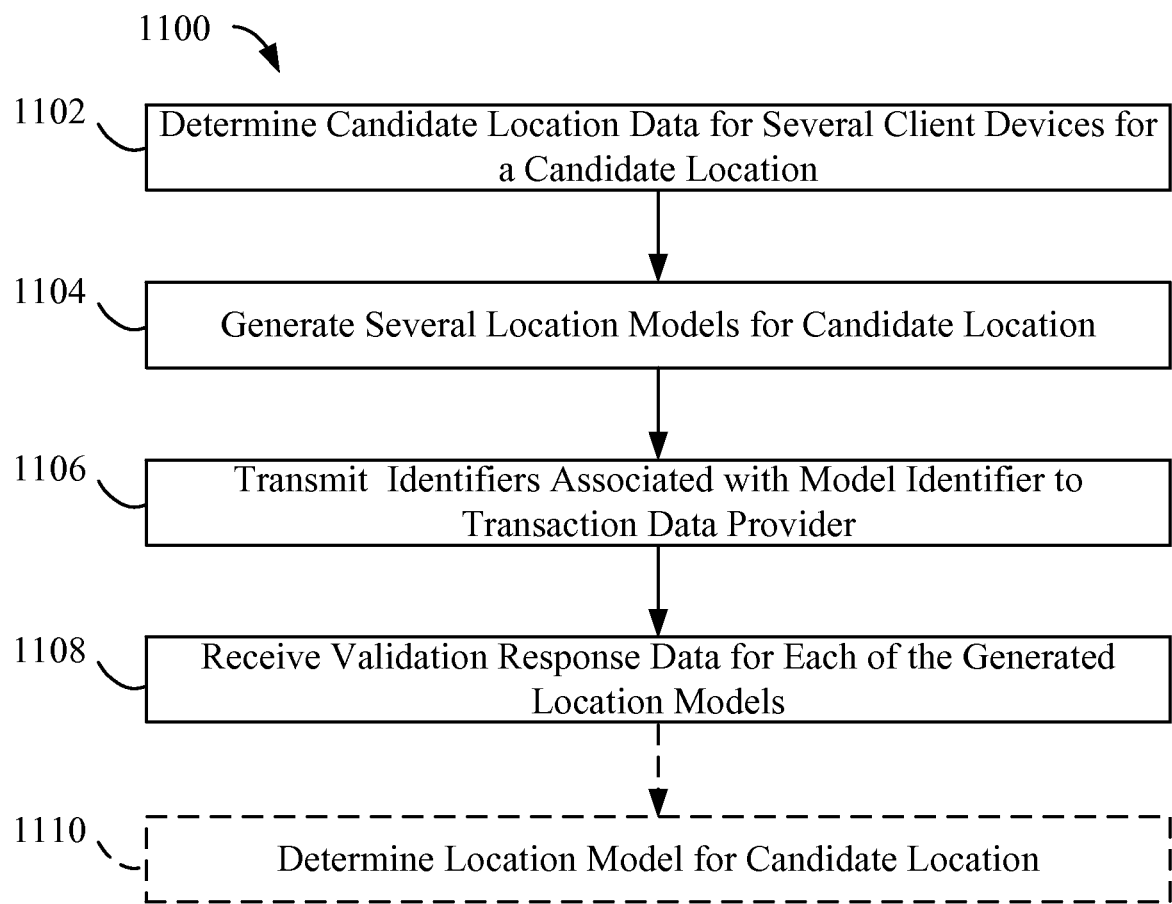
FIG. 11 is a flow diagram depicting an implementation of a process for receiving validation data for several generated models for aggregate model validation.

FIG. 11 depicts an implementation of a process 1100 for receiving validation data for several generated models for aggregate model validation. The process 1100 includes determining candidate location data for several client devices for a candidate location (block 1102). In some instances, the candidate location data may be clustered and potential location models may be generated based on each cluster of candidate location data. In some implementations, the determination of each cluster of candidate location data for several client devices for a candidate location for a potential location model may be based on process 600 of FIG. 6. In other implementations, the determination of the candidate location data for several client devices for a candidate location may be done via a selection received by the location modeling system.

The process 1100 generates several location models for a candidate location based on the candidate location data (block 1102). The generation of the several location models for a candidate location may be done by a location modeler, such as location modeler 410 of FIG. 4, executing a machine learning algorithm, such as a regression learning algorithm, and using the candidate location data. Implementations of such regression learning algorithms include perceptron linear learning, maximum entropy logistic regression, support vector machine (SVM) regression with maximum entropy gradient, descent least-squares stochastic gradient, etc. That is, in an implementation, if a set of candidate location data may be clustered into three clusters of candidate location data (block 1102), then three potential location models may be generated (block 1104). Each potential location model assumes that the corresponding clusters of candidate location data used to generate each potential location model is accurate for determining whether a client device is located at a candidate location.

The identifiers for client devices corresponding to the clusters of candidate location data may be included in an aggregated query transmitted to the transaction data provider to evaluate the accuracy of each potential location model (block 1106). That is, an aggregated query for each potential model may be generated and sent to the transaction data provider, such as transaction data provider 490, that includes an identifier for the model (e.g., Model #1), sets of identifiers associated with the client devices (or common pseudorandom identifiers) associated with the candidate location data used to generate the potential location model and a time range associated with the candidate location data (e.g., PID #3421, $T_1$, $T_2$, PID #4362, $T_3$, $T_4$, etc.), and an identifier for the candidate location (e.g., CID #123456789 or Company1Store #237). A second aggregated query for a second potential model may be generated and sent to the transaction data provider, such as Model #2, PID #3456, $T_1$, $T_2$, PID #4321, $T_3$, $T_4$, CID #123456789.

The generated queries are representative of guesses, such as Model #1 says PID #3421 was in a candidate location of CID #123456789 between $T_1$ and $T_2$, Model #1 says PID #4362 was in a candidate location of CID #123456789 between $T_3$ and $T_4$, Model #2 says PID #3456 was in a candidate location of CID #123456789 between $T_1$ and $T_2$, Model #2 says PID #4321 was in a candidate location of CID #123456789 between $T_3$ and $T_4$, etc. In some implementations, each identifier associated with the client device and corresponding time range may be sent as separate queries.

Responsive to the model queries transmitted to the transaction data provider, validation response data may be received by the location modeling system for each of the models (block 1108). For instance, the transaction data provider may compare the sets of identifiers associated with the client devices (or common pseudorandom identifiers), the associated time ranges, and the identifier for the company to the transaction data and determine a number of matches. The transaction data provider may output the validation response data indicating a number of matches (e.g., 20 matching transactions). The received response may be, for instance, "Model #1, 20; Model #2, 5; Model #3, 0," indicating 20 matching transactions for potential location model #1, 5 matching transactions for potential location model #2, and no matching transactions for potential location model #3.

The process 1100 may further include determining a location model for the candidate location (block 1110). For instance, the validation response data for each model may be used to evaluate the accuracy of each generated potential location model. In some implementations, the location modeling system may determine that the location model with the highest matching number of transactions is the most accurate model. The candidate location data for the determined location model (block 1110) may, in some implementations, be added to a validated location data set for generating future location models for the candidate location. In some implementations, the determination of a location model may further include determining if the location model with the highest matching number of transactions exceeds a predetermined threshold based on the validation response data. The predetermined threshold may be 10 matches, 15, matches, 20 matches, 50 matches, 100 matches, etc. If the number of matches exceeds the predetermined threshold, the candidate location data may, in some implementations, be added to a validated location data set for generating future location models for the candidate location. In other implementations, if the number of matches exceeds the predetermined threshold, the location model may be stored in the location model database 414 and/or otherwise used as a substantially accurate location model.

In some implementations, the candidate location data for the other potential location models may be used a negative indicator location data by the location modeler of the location modeling system to generate another location model.

In some implementations, the signal strength, such as RSSI or RCPI, may be calibrated to account for variance between client devices. Such calibration may be performed prior to using generating a location model using the signal strength from the client device.

Figure 12:
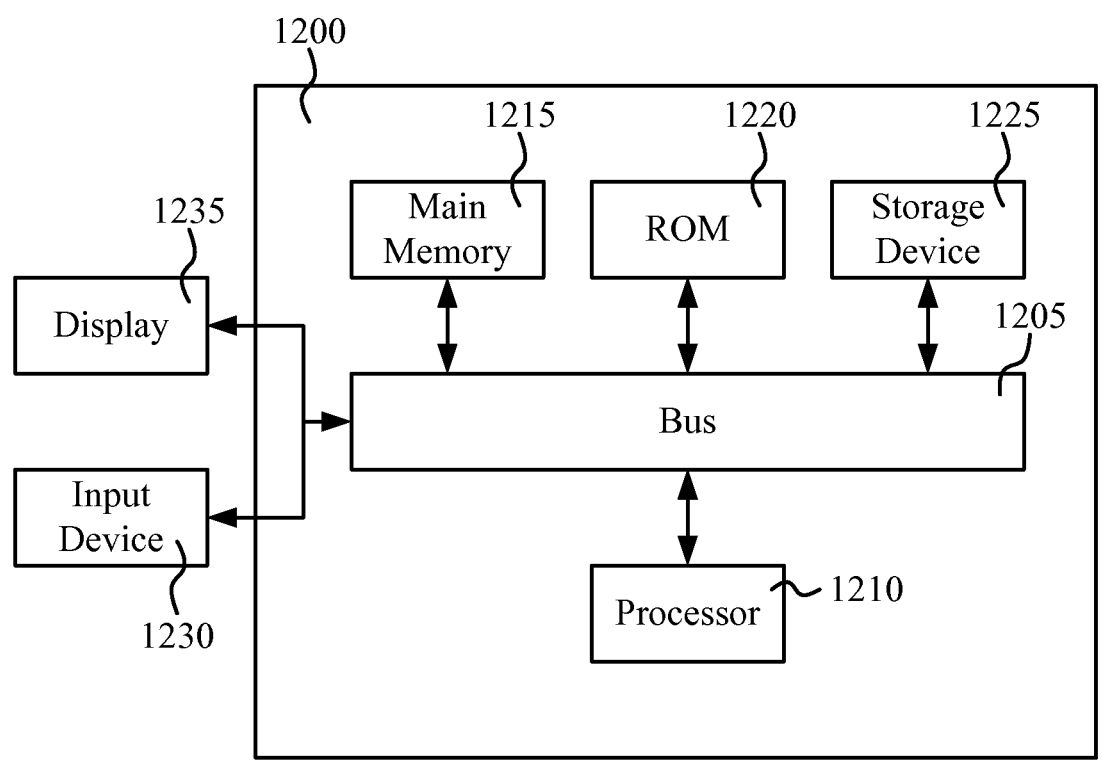
FIG. 12 is a block diagram illustrating a general architecture for a computer system that may be employed to implement various elements of the systems and methods described and illustrated herein.

FIG. 12 is a block diagram of a computer system 1200 that can be used to implement the client device 102, content provider 120, location modeling system 400, transaction data provider 490, etc. The computing system 1200 includes a bus 1205 or other communication component for communicating information and a processor 1210 or processing module coupled to the bus 1205 for processing information. The computing system 1200 can also include one or more processors 1210 or data processors coupled to the bus for processing information. The computing system 1200 also includes main memory 1215, such as a RAM or other dynamic storage device, coupled to the bus 1205 for storing information, and instructions to be executed by the processor 1210. Main memory 1215 can also be used for storing position information, temporary variables, or other intermediate information during execution of instructions by the processor 1210. The computing system 1200 may further include a ROM 1220 or other static storage device coupled to the bus 1205 for storing static information and instructions for the processor 1210. A storage device 1225, such as a solid state device, magnetic disk or optical disk, is coupled to the bus 1205 for persistently storing information and instructions. Computing device 1200 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 1200 may be coupled via the bus 1205 to a display 1235, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information. An input device 1230, such as a keyboard including alphanumeric and other keys, may be coupled to the bus 1205 for communicating information and command selections to the processor 1210. In another implementation, the input device 1230 may be integrated with the display 1235, such as in a touch screen display. The input device 1230 can include a cursor control, such as a mouse, a trackball, or cursor direction keys, for communicating direction information and command selections to the processor 1210 and for controlling cursor movement on the display 1235.

According to various implementations, the processes and/or methods described herein can be implemented by the computing system 1200 in response to the processor 1210 executing an arrangement of instructions contained in main memory 1215. Such instructions can be read into main memory 1215 from another computer-readable medium, such as the storage device 1225. Execution of the arrangement of instructions contained in main memory 1215 causes the computing system 1200 to perform the illustrative processes and/or method steps described herein. One or more processors in a multi-processing arrangement may also be employed to execute the instructions contained in main memory 1215. In alternative implementations, hardwired circuitry may be used in place of or in combination with software instructions to effect illustrative implementations. Thus, implementations are not limited to any specific combination of hardware circuitry and software.

Although an implementation of a computing system 1200 has been described in FIG. 12, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," "processing circuit," "processing module," or "data processor" encompass all kinds of apparatus, devices, and machines for processing data, including a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, for instance, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto optical disks; and CD ROM and DVD disks. The processor and the memory can be supplemented by, or incorporated in, special purpose logic circuitry.

To provide for interaction, implementations of the subject matter described in this specification can be implemented on a computer having a display device, e.g., a CRT (cathode ray tube) or LCD monitor, for displaying information and a keyboard and a pointing device, e.g., a mouse or a trackball, by which input to the computer may be provided. Other kinds of devices can be used to provide for interaction as well; for instance, feedback can be any form of sensory feedback, e.g., visual feedback, auditory feedback, or tactile feedback; and input can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for validating candidate location data, comprising:
   receiving, by one or more data processors, from a client device, location data of the client device, the location data comprising an identifier of the client device and a plurality of signal strength values of a respective plurality of wireless access points detected by the client device, each of the respective plurality of wireless access points proximate to a candidate location;
   determining, by the one or more data processors, based on the plurality of signal strength values, that the one or more data processors are unable to distinguish whether the location data is associated with a location inside or outside of the candidate location;
   generating, by the one or more data processors, a query for a transaction data provider asking whether the transaction data provider has a record of a past transaction associated with the identifier of the client device at the candidate location;
   transmitting, by the one or more data processors, the generated query to the transaction data provider;
   receiving, by the one or more data processors, from the transaction data provider responsive to the transmitted query, a validation response confirming that the transaction data provider has the record of the past transaction associated with the identifier of the client device;
   generating, by the one or more data processors and responsive to receipt of the validation response, a location model for the candidate location using the location data received from the client device and the validation response;
   receiving, by the one or more data processors, from a second client device, a second plurality of signal strength values of the respective plurality of wireless access points detected by the second client device; and
   determining, by the one or more data processors, that the second client device is inside of the candidate location based on the location model and the second plurality of signal strength values of the respective plurality of wireless access points detected by the second client device.

2. The method of claim 1, wherein the generated query comprises the identifier of the client device, an identifier associated with the candidate location, and a time.

3. The method of claim 2, wherein the identifier of the client device is a pseudorandom identifier common to the transaction data provider and a location modeling system.

4. The method of claim 2, wherein the time is a time range.

5. The method of claim 2, wherein the generated query further comprises a query identifier.

6. The method of claim 1, further comprising determining, by the one or more data processors that the location data is within a predetermined range of the candidate location.

7. The method of claim 6, further comprising determining, by the one or more data processors, that the location data is within the predetermined range of the candidate location for a time that is equal to or exceeds a predetermined time threshold.

8. The method of claim 7, wherein the location data is added to a positive indicator location data set responsive to determining that the location data is within the predetermined range of the candidate location for the time equal to or greater than the predetermined time threshold.

9. A system for validating candidate location data, comprising:
   one or more data processors; and
   one or more storage devices storing instructions that, when executed by the one or more data processors, cause the one or more data processors to perform operations comprising:
      receiving, from a client device, location data of the client device, the location data comprising an identifier of the client device and a plurality of signal strength values of a respective plurality of wireless access points detected by the client device, each of the respective plurality of wireless access points proximate to a candidate location;
      determining, based on the plurality of signal strength values, that the one or more data processors are unable to distinguish whether the location data is associated with a location inside or outside of the candidate location;
      generating a query for a transaction data provider asking whether the transaction data provider has a record of a past transaction associated with the identifier of the client device at the candidate location;

transmitting the generated query to the transaction data provider;

receiving, from the transaction data provider responsive to the transmitted query, a validation response confirming that the transaction data provider has the record of the past transaction associated with the identifier of the client device;

generating, responsive to receipt of the validation response, a location model for the candidate location using the location data received from the client device and the validation response;

receiving, from a second client device, a second plurality of signal strength values of the respective plurality of wireless access points detected by the second client device; and determining that the second client device is inside of the candidate location based on the location model and the second plurality of signal strength values of the respective plurality of wireless access points detected by the second client device.

10. The system of claim 9, wherein the one or more storage devices store instructions that cause the one or more data processors to perform further operations comprising:

transmitting the location data to the transaction data provider as part of the query; and receiving validated location data from the transaction data provider responsive to the transmitted location data as part of the validation response.

11. The system of claim 10, wherein the validated location data comprises a MAC address and a count indicating a number of occurrences of the MAC address in the validated location data.

12. The system of claim 9, wherein the one or more storage devices store instructions that cause the one or more data processors to perform further operations comprising:

generating an aggregated query based on a set of identifiers, including the identifier of the client device, associated with a plurality of client devices, a set of times associated with the plurality of client devices, and the candidate location; and receiving validated response data from the transaction data provider responsive to the generated aggregate query.

13. A non-transitory computer readable storage device storing instructions that, when executed by one or more data processors, cause the one or more data processors to perform operations comprising:

receiving, from a client device, location data of the client device, the location data comprising an identifier of the client device and a plurality of signal strength values of a respective plurality of wireless access points detected by the client device, each of the respective plurality of wireless access points proximate to a candidate location;

determining, based on the plurality of signal strength values, that the one or more data processors are unable to distinguish whether the location data is associated with a location inside or outside of the candidate location;

generating a query for a transaction data provider asking whether the transaction data provider has a record of a past transaction associated with the identifier of the client device at the candidate location;

transmitting the generated query to the transaction data provider;

receiving, from the transaction data provider responsive to the transmitted query, a validation response confirming that the transaction data provider has the record of the past transaction associated with the identifier of the client device;

generating, responsive to receipt of the validation response, a location model for the candidate location using the location data received from the client device and the validation response;

receiving, from a second client device, a second plurality of signal strength values of the respective plurality of wireless access points detected by the second client device; and determining that the second client device is inside of the candidate location based on the location model and the second plurality of signal strength values of the respective plurality of wireless access points detected by the second client device.

14. The non-transitory computer readable storage device of claim 13, wherein the identifier of the client device comprises a MAC address.

15. The non-transitory computer readable storage device of claim 13, wherein the identifier of the client device comprises a common pseudorandom identifier used by the transaction data provider.

16. The non-transitory computer readable storage device of claim 13, wherein the query comprises the identifier of the client device, an identifier associated with the candidate location, and a time.

17. The non-transitory computer readable storage device of claim 13, wherein the past transaction comprises at least one of a purchase, a use of a rewards card, or a redemption of a coupon.

* * * * *